(12) United States Patent
Kobori et al.

(10) Patent No.: US 7,336,322 B2  
(45) Date of Patent: Feb. 26, 2008

(54) IMAGE DISPLAY APPARATUS

(75) Inventors: Tomoki Kobori, Kamakura (JP); Satoshi Ouchi, Kamakura (JP); Tsuneyuki Nozawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 527 days.

(21) Appl. No.: 11/063,972

(22) Filed: Feb. 24, 2005

(65) Prior Publication Data
US 2005/0231650 A1 Oct. 20, 2005

(30) Foreign Application Priority Data
Apr. 2, 2004 (JP) ............................. 2004-109597

(51) Int. Cl.
- H04N 9/12 (2006.01)
- H04N 5/66 (2006.01)
- H04N 9/30 (2006.01)

(52) U.S. Cl. .................. 348/795; 348/791; 348/744

(58) Field of Classification Search ................ 348/743, 348/744, 750–752, 759–762, 766, 767, 790–792, 348/795; 345/84, 87, 88; H04N 5/66, 9/12, H04N 9/30

See application file for complete search history.

(56) References Cited

U.S. PATENT DOCUMENTS 6,545,279 B1 * 4/2003 Yoshida et al. .......... 250/341.4  
7,081,928 B2 * 7/2006 Hubby, Jr. .................. 348/744

FOREIGN PATENT DOCUMENTS

| CN | 1451990 A | 10/2003 |
| JP | 8-101387 | 4/1996 |
| JP | 10-78550 | 3/1998 |
| JP | A-HEI11-64845 | 3/1999 |
| JP | 2000-259127 | 9/2000 |

* cited by examiner

Primary Examiner—Sherrie Hsia  
(74) Attorney, Agent, or Firm—Antonelli, Terry, Stout & Kraus, LLP.

(57) ABSTRACT

An image display apparatus includes a second converging unit constructed so that a light flux from part of a first light source or from a separately provided second light source is converged to have a line shape, a spectroscope/deflector unit constructed so that his line-shape light flux is irradiated on a region of the display device different from the region on which a strip-shape light flux from a first converging unit is irradiated, and an image processing unit constructed to control so that the pixels of the region of the display device on which the line-shape light flux is irradiated is turned on and off in accordance with image data being displayed.

18 Claims, 8 Drawing Sheets

FIG.5A  FIG.5B
DISPLAYED REGIONS AND FLUX-IRRADIATED REGIONS
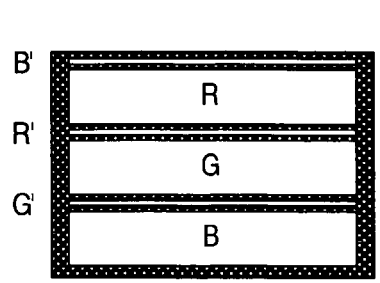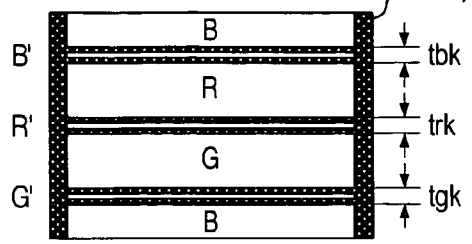
TIME t0    TIME t1
FIG.6A  FIG.6B
DISPLAYED REGIONS AND FLUX-IRRADIATED REGIONS
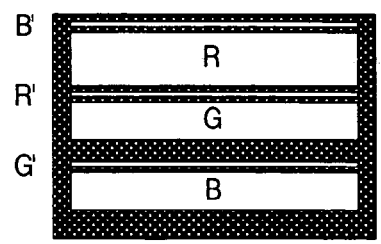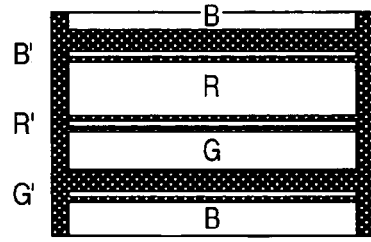
TIME t0    TIME t1
FIG.7A  FIG.7B
DISPLAYED REGIONS AND FLUX-IRRADIATED REGIONS
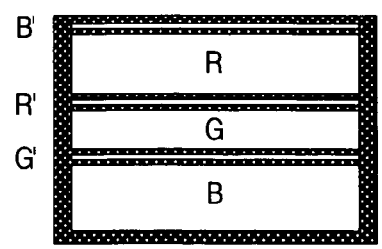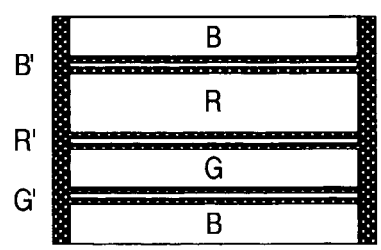
TIME t0    TIME t1

IMAGE DISPLAY APPARATUS

INCORPORATION BY REFERENCE

The present application claims priority from Japanese application JP 2004-109597 filed on Apr. 2, 2004, the content of which is hereby incorporated by reference into this application.

BACKGROUND OF THE INVENTION

The present invention generally relates to technologies for displaying images by irradiating a light flux from a light source onto a display device such as a transmissive or reflective type liquid panel or a panel with very small mirrors, and particularly to a front-type or rear-type projection display apparatus or television apparatus for reproducing color images by modulating the amounts of color light in a color sequential manner.

There is a known projection-type display apparatus in which images can be displayed in such a manner that the amounts of the light fluxes emitted from the light source side and transmitted through or reflected from a transmissive or reflective liquid crystal panel can be controlled in accordance with the gradation levels of the inputted image data. There is also another known projection type display apparatus that has a reflective panel formed of a number of very small mirrors of which the number corresponds to that of all the pixels for the display so that the contrast and the utilization ratio of light can be improved. For example, documents of, for example, JP-A-10-78550 and JP-A-2000-259127 describe a projection type display apparatus having a reflective display device formed of very small mirrors.

In this display apparatus, the gradients of the very small mirrors arranged in a two-dimensional manner to oppose the respective pixels are controlled (to be on or off) so that light can be reflected (on) or not (off) from the mirrors into the projection lens to reproduce an image. The rate of the on/off time of the very small mirrors and the integral effect of visual sense within the frame period (for example, about 16.7 m sec when 60 Hz is used) as an image unit to be displayed are utilized to achieve the gradation expression.

In this case, the reproducible gradation number depends on the speed of controlling the very small mirrors. In addition, each of the very small mirrors is switched to one of the red (R), green (G) and blue (B) in a time-division manner to reproduce a color image. The construction of the apparatus is thus determined according to the use. Moreover, the reproducible gradation number is increased by employing the area gradation using the error diffusing method/dither method approach. Also, a technique is proposed for amplifying white brightness by making effective use of the very small mirrors in time axis.

Another display apparatus is proposed as described in JP-A-8-101387, in which the contrast is adjusted to improve the image reproducibility by switching a plurality of light sources including a lamp light source and LEDs and by appropriately changing the transmission factor of the display device.

In the case of those projection type display apparatus using such display devices, the light source is actually a Xenon lamp or metal halide lamp because it is desired to be a point light source from the light concentration point of view and excellent in spectrum, to have a high emission efficiency and a long life, and to provide uniform light intensity with less irregular emission.

Recently, the performance of LED has been improved in color emission, brightness and life span, and thus the use of LED has been expanded to the backlight of different display apparatus, and traffic lights.

SUMMARY OF THE INVENTION

The document of JP-A-10-78550 describes the technique of emphasizing white brightness by effectively using very small mirrors in the time axis direction. The document of JP-A-2000-259127 discloses the gradation reproducing technique for improving the picture quality. The document of JP-A-8-101387 describes that a plurality of light sources are alternately switched, and that the contrast is chiefly adjusted for each picture frame/local region.

It is an objective of the invention to provide a system and apparatus for further improving the related arts, or a projection type display apparatus for increasing the number of displayed gradations with low cost and with power saving.

In order to solve the above problems, the image display apparatus is constructed to have a single display device constructed so that the light fluxes corresponding to an image signal can be written or displayed on different regions corresponding to the number of at least primary colors (RGB), a first converging unit constructed so that the light flux from a first light source can be converged to have a strip shape (light band shape), a spectroscope/deflector unit constructed so that the light flux can be divided into light fluxes of primary color (RGB) components, so that the R/G/B light fluxes can be simultaneously irradiated on different regions into which the area of display device is divided equally, or fixedly or arbitrarily unequally at the same time, and so that the light fluxes are deflected at least once vertically or horizontally across the display device during each frame period, an image processing unit for generating an image signal and driving the display device in accordance with the position and speed of each deflected R/G/B flux so that the line scanning speed of the image signal on the display device can be synchronized with the deflected speed and line phase of each light flux, and a second converging unit constructed so that a light flux from part of the first light source or from a separately provided second light source can be converged to have a line shape so that the spectroscope/deflector can control the line-shape light fluxes to be irradiated on regions different from the regions on which the fluxes from the first converging unit are irradiated. In addition, the image-processing unit controls the regions and corresponding pixels of the display device on which the line-shape light fluxes are irradiated to be turned on and off in accordance with the image data.

Here, according to the invention, there is provided an image display apparatus in which the effective gradation number can be expanded to achieve high-quality images by the relations of (1) the time length of on/off of pixels, (2) the increase or decrease of the amount of light flux converged to be a line shape, (3) the adjustment of light emission period and (4) the number of times that the light flux is deflected to scan the display device over the display region vertically or horizontally during each frame period.

In addition, there is provided an image display apparatus in which the second light source is replaced by the third, fourth and fifth light sources (for example, of R/G/B), and a second lamp driver is provided to control the amounts that the third, fourth and fifth light sources emit light and the emission periods of the sources so that the above items (2) and (3) can be made on the basis of the image data according to the input image, thus reproducing high-quality images by precisely controlling the expansion of the effective gradation number for each primary color.

Also, there is provided an image display apparatus in which the desired amount of light flux from the second light source is enough to express the low gradation region, and the flux is converged to have a line shape by the second converging unit, thus the second light source being smaller than the first light source, resulting in low cost and low power consumption.

Moreover, there is provided an image display apparatus in which the second light source or third, fourth and fifth light sources are intermittently energized to emit light so that the amount of generated heat can be reduced and that the performance of parts can be maintained satisfactory for a long time.

Thus, according to the invention, the images can be displayed with high gradation.

Other objects, features and advantages of the invention will become apparent from the following description of the embodiments of the invention taken in conjunction with the accompanying drawings.

BRIEF DESCRIPTION OF THE DRAWINGS

FIGS. 5A and 5B are diagrams showing the displaying status to which reference is made in explaining the first and second embodiments of the invention.

FIGS. 6A and 6B are other diagrams showing the displaying status to which reference is made in explaining the first and second embodiments of the invention.

FIGS. 7A and 7B are still other diagrams of the displaying status to which reference is made in explaining the first and second embodiments of the invention.

DETAILED DESCRIPTION OF THE EMBODIMENTS

The invention will be described with reference to the accompanying drawings.

Embodiment 1

Figure 1:
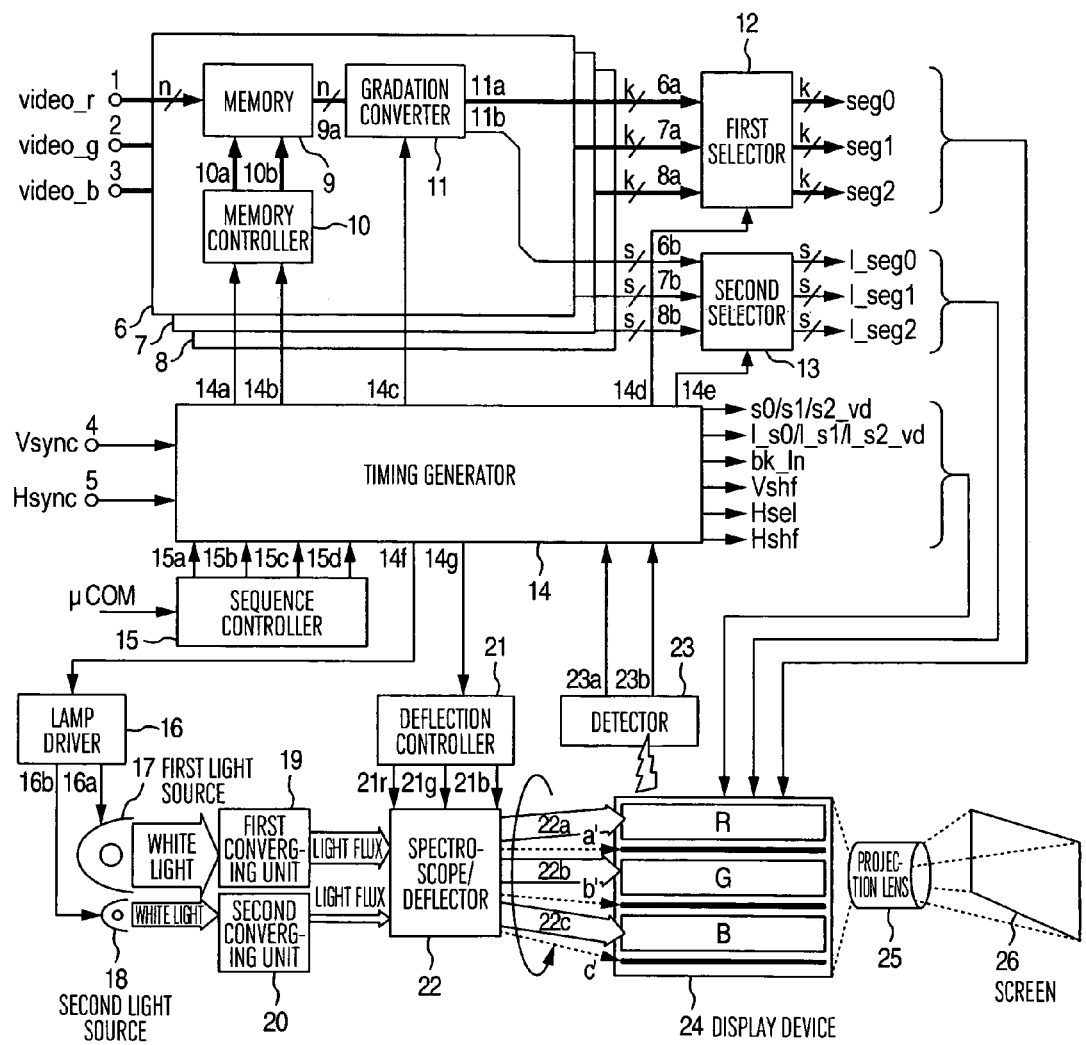
FIG. 1 is a block diagram showing the construction of an image display apparatus of the first embodiment according to the invention.
Figure 2:
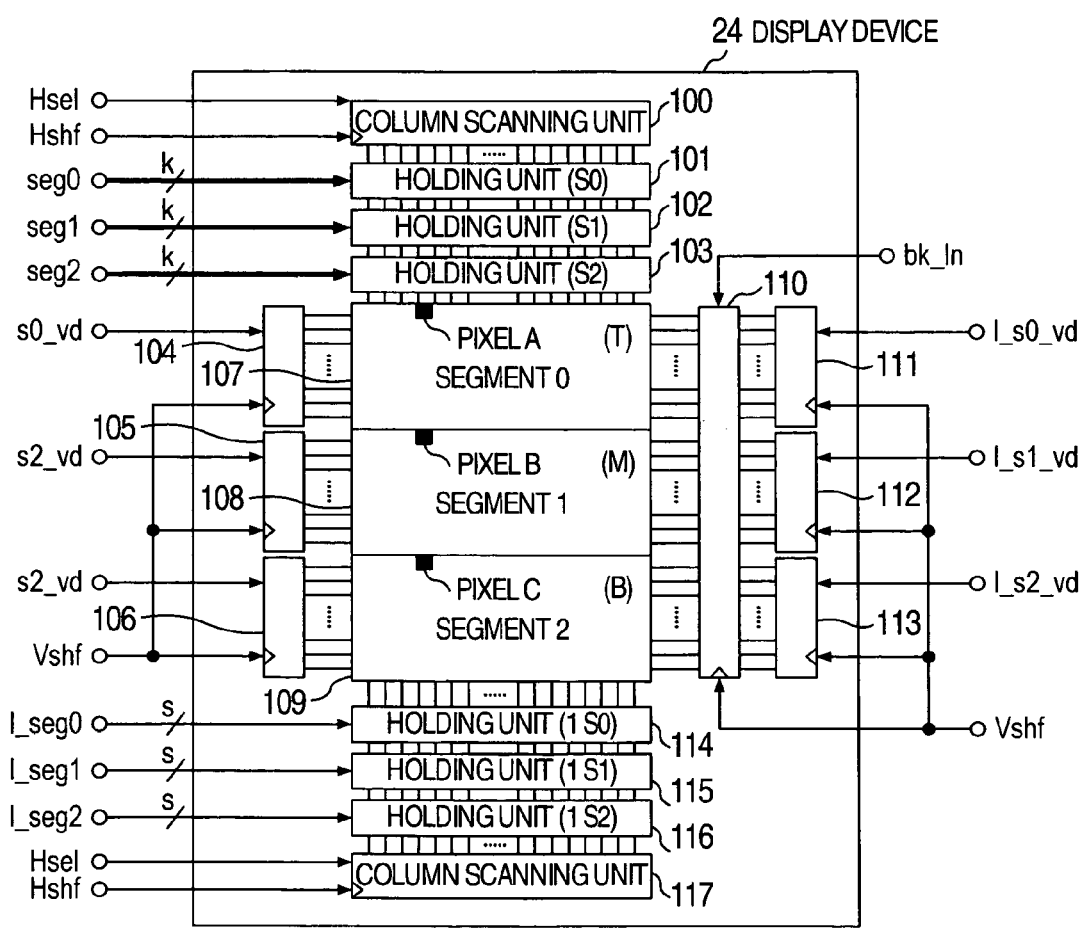
FIG. 2 is a diagram showing the construction of the display device used in the first embodiment of the invention.
Figure 3:
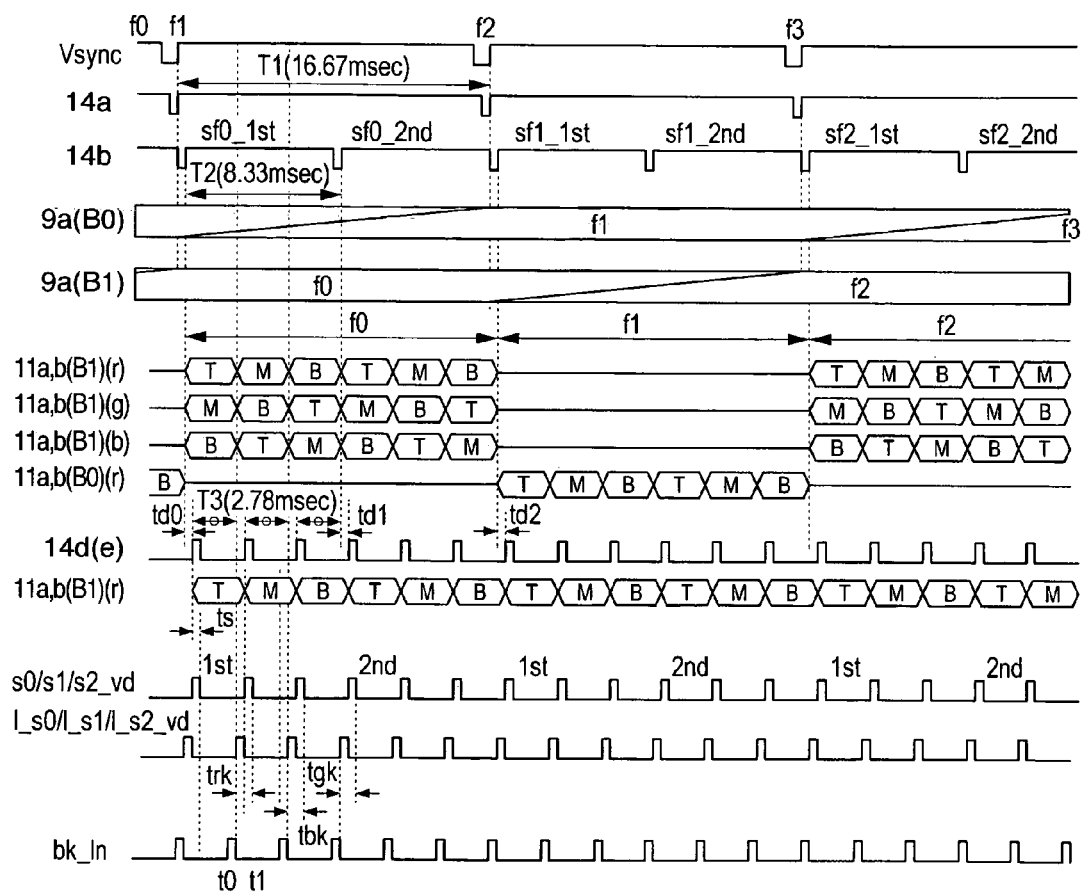
FIG. 3 is a waveform diagram to which reference is made in explaining the first and second embodiments of the invention.
Figure 4:
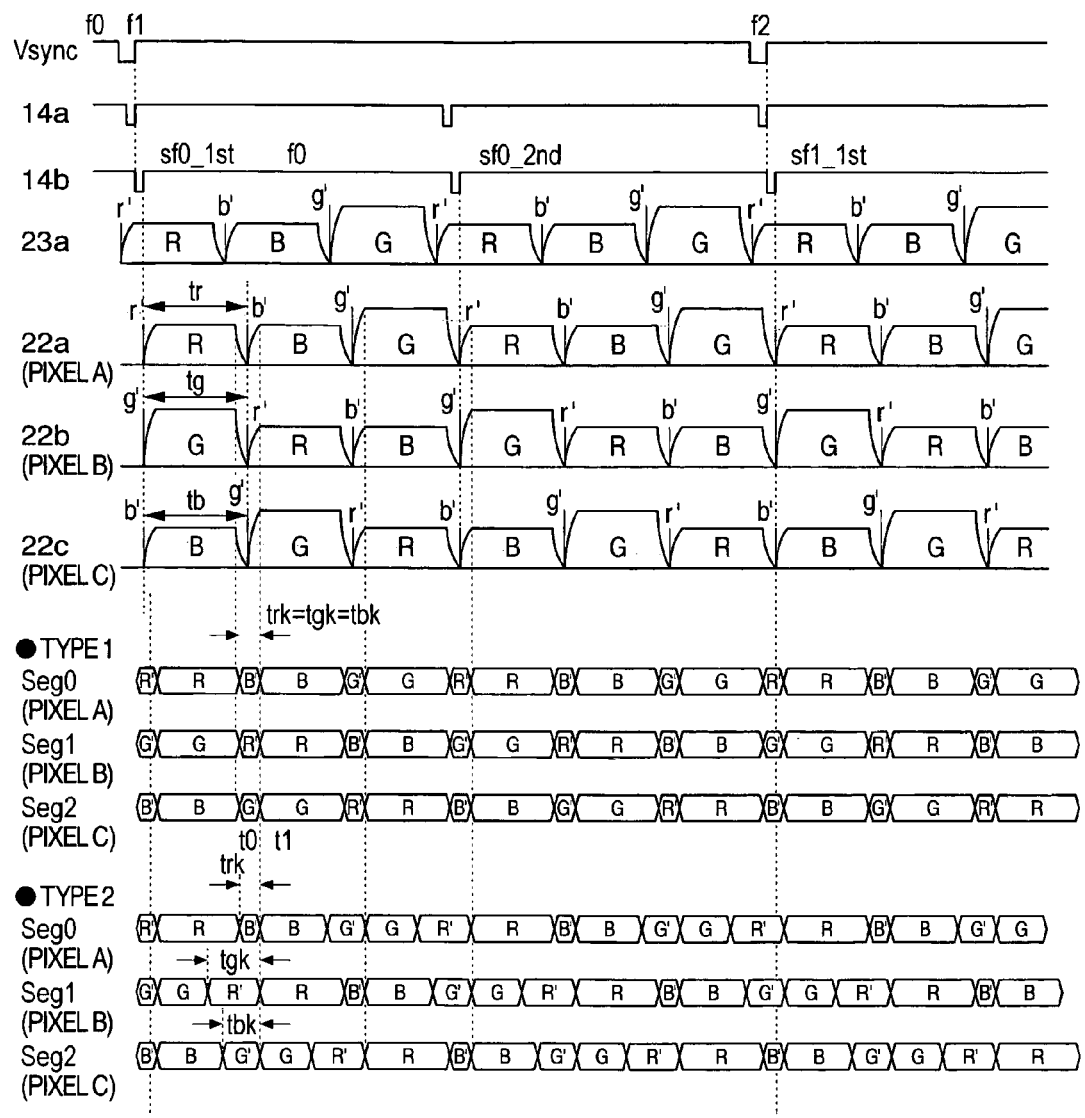
FIG. 4 is another waveform diagram to which reference is made in explaining the first and second embodiments of the invention.

FIG. 1 is a block diagram showing the construction of an image display apparatus as a projection type display apparatus of the first embodiment according to the invention. FIG. 2 is a block diagram showing an example of the display device according to the invention. FIGS. 3 and 4 are waveform diagrams of signals showing the operation timing of processing elements.

In the display device of this embodiment, the gradients of very small mirrors arranged in a two-dimensional manner are controlled (on/off) so that light is reflected (on) or not (off) from the mirrors into a projection lens to reproduce an image. Also, the rate of on/off time of the very small mirrors and integral effect of visual sense within a frame period (for example, about 16.7 m sec when 60 Hz is used) of displayed image unit are utilized to achieve the gradation expression. Of course, even if the display apparatus is formed of a transmission-type or reflective-type liquid crystal display device, the same effect can be achieved although there are even differences between light paths.

In addition, this embodiment proposes a projection type display apparatus in which a single display device is used for a sequence of colors, and the persistence of vision of visual sense is utilized so that we can recognize color moving pictures.

Moreover, an image is displayed on the display device at a frame frequency Fv of, for example, 60 Hz (T1=about 16.67 m sec) (frame number f0, f1, f2, f3 . . . ) and at a sub-frame frequency sf, or twice the frame frequency (T2=2×60 Hz=120 Hz=about 8.33 m sec) (sub-frame number sf01$st$, sf02$nd$, sf11$st$, sf12$nd$ . . . ). In this case, since colors are sequentially displayed during each sub-frame, the time allotted to the monochromatic emission is T3(=2.78 m sec). The ratio between the frame frequency Fv and sub-frame frequency sf is not limited to this value, but of course may be arbitrary as long as it is the optimum for the display of moving picture.

While the display device is assumed to update the displayed data each time the lines are switched in sequence for the sake of simplicity in this embodiment, it may be operated to update the image data at every divided units, or regions on the display device.

In addition, while the lines of an image are scanned from top to bottom in the vertical direction in this embodiment, the lines can be scanned from bottom to top in the vertical direction or left to right or right to left in the horizontal direction without departing from the scope of the invention. Moreover, while a specific construction is used in this embodiment, this invention is not limited to this construction, but the number of constituent members can be increased or decreased or the order of arranging those elements can be changed so as to make the same operation.

Referring to FIG. 1, there are shown input terminals 1, 2 and 3 to which RGB image information signals Video r/g/b of n bits each are fed, input terminals 4 and 5 respectively for vertical and horizontal synchronizing signals Vsync and Hsync, a memory 9 capable of holding at least two frames of each of the input image signals, a memory controller 10 by which the memory 9 is controlled to timely write and read the specified regions, and a gradation converter 11 that variously processes the input image information of n bits so as to convert it to information of (k+s) bits (n<(k+s), k>s) (in this embodiment, n, k and s are assumed to be n=8, k=8, s=2). Reference numerals 6, 7 and 8 represent R/G/B image processors, each of which is formed of the elements 9 through 11. There are also shown first and second selectors 12 and 13, a timing generator 14, a sequence controller 15, a lamp driver 16, a high-brightness first light source 17, a low-brightness second light source 18, first and second converging units 19 and 20, a deflection controller 21, a spectroscope/deflector 22, a detector 23, an image display device 24, a projection lens 25, and a screen 26. Referring to FIG. 2, there are shown column scanning units 100 and 117 that order to select and write the horizontal pixels, sample/hold units 101, 102, 103, 114, 115 and 116, vertical scanning units 104, 105, 106, 111, 112 and 113 that instruct to select and write the lines, segmental display areas 107, 108 and 109, each of which is formed of a plurality of pixels (very small mirrors), and a reset scanning unit 110 that orders to bring the initializing line of each of the segmental display areas.

The operation of each element will be described with reference to the waveform diagrams of FIGS. 3 and 4. The sequence controller 15 responds to a signal from an external system controller (μ COM), not shown, to generate signals of various different conditions, or a signal 15a that indicates the double speed condition of sub-frame frequency, a signal 15b that designates the amount of phase difference of the sub-frame start timing relative to the frame start reference timing, phase-difference information 15c of RGB lines, and various image-displaying mode information 15d.

The timing generator 14 first responds to the double speed condition signal 15a and the vertical and horizontal synch signals Vsync and Hsync to generate a frame start timing signal 14a and sub-frame start timing signal 14b of each image information signal video_r/g/b, and a mode signal 14c for designating the gradation conversion conditions that are used in the gradation converter 11 and determined for each sub-frame. Here, the gradation conversion conditions specify a computation precision that is assured at the time of each image process. The timing generator 14 also responds to light intensity change information 23a, 23b and phase difference information 15c to generate segment selection signals 14d and 14e that are fed to the first and second selectors 12 and 13 as image-reading start reference signals suitable for the position of each deflected color flux RGB. The light intensity change information 23a and 23b are detected from the strip-shape and line-shape light fluxes, which are described later, irradiated on the display device 24 as the feedback information of the way that the spectroscope/deflector 22 deflects the fluxes. Therefore, the phase difference (td0, td1, td2 . . . ) of the image-reading start reference signal 14d, 14e to the sub-frame start timing 14b is not always constant, but always changes according to the deflected states.

The timing generator 14 further responds to the fed-back information of light intensity change information 23a to generate a deflection-start reference control signal 14g of each flux RGB that controls the light intensity change to substantially coincide with the sub-frame period/phase, and a lamp-drive timing signal 14f which will be described later. In addition, the timing generator 14 generates vertical scan selection signals s0/s1/s2_vd and 1_s0/1_s1/1_s2_vd, a blacking line selection signal bk_1n for designating the blacked-line position, a vertical scan clock Vshf, a horizontal scan selection signal Hsel, and a horizontal scan clock Hshf, and supplies them to the display device 24 as signals for each of the segment 107 (T: Top), 108 (M: Middle) and 109 (B: Bottom) and for the strip-shape regions/line-shape regions.

In this case, the vertical scan selection signals s0/s1/s2_vd are synchronized with the image-read start reference signal 14d(e) with a phase difference ts maintained between them. Although not shown, the vertical scan selection signal 1_s0/1_s1/1_s2_vd is similarly synchronized with the image read start reference signal 14d(e) with a phase difference ts' maintained between them (ts'≠ts).

The blacking line selection signal bk_1n is generated in accordance with the image display mode information 15d to designate phase differences trk, tgk, tbk to the vertical scan selection signals s0/s1/s2_vd for each of the segments 107 through 109.

The image processors 6, 7, and 8 respectively operate to process the R/G/B image signals in the same way as described above.

The lamp driver 16 responds to the lamp-drive timing signal 14f to drive the first light source 17 and second light source 18, controlling their light emitting times and amounts of light emission as will be described later.

The first and second converging units 19 and 20 are optical lenses of which the light exiting faces are formed to have a strip shape and a line shape, respectively. They are arranged in an array or a pipe shape or an integral form. The converging units 19 and 20 receive the light fluxes from the light sources, converge them into a strip-like flux and a line-shape flux, and send out those fluxes.

The deflection controller 21 and spectroscope/deflector 22, which are not to be mentioned in this invention, are constructed to control the strip-shape light flux and line-shape light flux to be separated into R/G/B components, and also control the separated light fluxes to be deflected from top to bottom (scrolled) on the display device 24 in accordance with the deflection-start reference control signal 14g for each flux RGB. For example, the light fluxes separated into R/G/B components by a dichroic mirror are reflected from a polygon mirror, thus deflected.

The color sequential operation is made in this embodiment by using a single display device, and by vertically deflecting each flux to scan the segmental display areas formed for each R/G/B. The image information corresponding to each color component of the irradiated light flux is used to drive the display device 24, and the number of times the light flux is reflected is controlled to give gradation levels as will be described below.

The memory controller 10 supplies a write control signal 10a to the memory 9 to divide the area of the memory 9 into two parts (B0/B1), and to alternately select each of the regions that are to be written each time the frame start signal 14a is fed to the memory controller 10.

As illustrated in FIG. 3, if the frame number is represented by f0, f1, f2, f3 . . . in turn, frame data of f1 and f3 are stored in the B0 of memory 9 and frame data of f0 and f2 in the B1 of the memory 9.

The memory controller 10 generates the read control signal 10b in response to the sub-frame start timing signal 14b and supplies it to the memory 9 to thereby read out the image information from the region (B0/B1) in which no information is now being written. In this case, the information of the same pixel is read twice for each frame because the sub-frame frequency is twice higher than the frame frequency. Also, since the display area is divided by three (T: Top, M: Middle, B: Bottom), the image processors 6, 7 and 8 read out image information signals 9a(r), (g) and (b) from different regions, respectively.

The gradation converter 11 expands the gradation number to (k+s) (k=n=8, s=2) bits for each sub-frame because of assuring the computation precision for image process determined by the various image display mode information 15d and mode signal 14c, and produces image information signals 11a and 11b of k bits and s bits, respectively. Here, the gradation-expressing number of k bits is assigned to the strip-shaped region, and the gradation-expressing number of s bits to the line-shape region. In addition, since the gradation bits are given to each sub-frame, the gradation bit number for each frame is (k+s) bits. Although not shown here, the relation between the increase or decrease of sub-frame number and the gradation-expressing number is of course similarly determined.

The first selector 12 responds to the selection signal 14d to switch the image information signals 6a(r_dt), 7a(g_dt) and 8a(b_dt) of k bits each so that each seg0/1/2 corresponding thereto can be selected, and to produce a write image signal seg0/1/2. Similarly, the second selector 13 responds to the selection signal 14e to switch the image information signals 6b(r_dt), 7b(g_dt) and 8b(b_dt) of s bits so that each segment 0/1/2 can be selected, and to produce a write image signal 1_seg0/1/2 corresponding to the incremental bits resulting from the expansion of gradation. In this case, there is no need for the pixels of the write image signals seg0/1/2 and 1_seg0/1/2 to coincide with each other at the same output time, but the output timing may be adjusted to coincide with the position of each written pixel on the display device 24.

The first light source 17 is a high-brightness lamp of white light such as UHP lamp or metal halide lamp, and it may be of DC drive type or of AC drive type. If it is of the DC drive type that is driven by the lamp driver 16 in accordance with the control signal 14f, the emission brightness is controlled. If it is of the AC drive type that is driven as above, the light emission brightness and lamp drive direction switching are controlled. In addition to the first light source 17, the low-brightness light source 18 (for example, white LED) is driven. Moreover, the amounts of light emission from the first and second light sources 17 and 18 may be controlled for each sub-frame unit. If the amount of light emission is dropped as much as 50 percent, the brightness per gradation unit can be halved, and thus the gradation can be more precisely expressed.

The deflection controller 21 and the spectroscope/deflector 22 can cause the strip-shaped and line-shaped light fluxes R/G/B to be simultaneously and uniformly irradiated onto the display device 24 over their corresponding different regions that are divided equally or divided unequally with a fixed ratio or arbitrary ratio, and to be deflected once from top to bottom on the display device during each sub-frame period. The image processors 6, 7 and 8, which generate the image signals and drive the display device 24 in accordance with the results of detecting the positions and speed of deflected light fluxes R/G/B by the detector 23, cause the deflection speed and line phase of the light fluxes to coincide with the line scanning speed of the display device 24 so that the corresponding pixels can be energized by the image signal seg0/1/2 to produce gradations. The detailed operation will be described later.

In addition, the light flux (white light) from the second light source 18 is converged to have a line shape by the second converging unit 20. In the same way as in the above, the spectroscope/deflector 22 separates the flux into primary color components (RGB), and simultaneously irradiates the line-shaped R'/G'/B' fluxes on the display device 24 over the regions different from the above regions so that it can operate in association with the above operation.

On the other hand, the image processors 6, 7 and 8 control the linearly irradiated regions and the corresponding pixels of the display device 24 to turn on (white) and off (black) in accordance with the image data 1_seg0/1/2. Here, the gradation number on the display may be controlled by a combination of (1) the time length of on/off of pixels (panel control), (2) the increase and decrease of the amounts of light fluxes converged to have a line shape (lamp control), (3) the adjustment of light emission period (structural adjustment of first and second converging units) and (4) the number of times that the light fluxes are deflected to scan the display device 24 over the display regions vertically or horizontally during each frame period (sub-frame number control). Thus, the gradation can be expressed with high degree of freedom.

FIGS. 5A and 5B show the deflected states of fluxes on the display device 24 at particular times t0 and t1 shown in FIGS. 3 and 4. The black and line-shaped R/G/B flux are irradiated at the boundary between the formed RGB fluxes. The deflected positions of the fluxes move in synchronism with the written lines on the segmental display areas as will be described later.

The detector 23 detects and produces the light intensity change information 23a of each RGB light flux. If the detector 23 is disposed near the deflection start positions of the segmental display areas 107 through 109, it produces the output 23a of which the waveform (conceptual view) is shown in FIG. 4. Here, if the wavelengths of the emitted light components are not uniformly distributed depending on the kind of white light source, a brightness distribution occurs between the color components, and thus the light intensity change information 23a provides different values between color components (wave height difference). If the light intensity information 23a is generated by extracting, for example, only G component as a particular wavelength component, it is possible to reduce the deterioration of detection precision due to the leak of a light component between the adjacent components. In addition, by forming a photosensitive element on the display device, it is possible to construct a system with low-peripheral part, high precision and no positional adjustment.

The display device 24 has elements with a light valve function arranged to control the amount of reflected light in accordance with the number of gradations expressed by the k-bit image information signal. In this embodiment, it is a TN-type liquid crystal device. The operation of the display device 24 will be described with reference to FIG. 2.

The column scanning unit 100 shifts the horizontal scan selection signal Hsel in accordance with the horizontal scan clock Hshf, and specifies pixels to be written in the line direction.

Similarly, the image information 1 . . . seg0/1/2 of s bits are sampled and held at the corresponding sample/hold unit 114 through 116, and drive the pixels being written of the segmental display areas 107 through 109 in corporation with the horizontal scan selection signal Hsel shifted at column scanning unit 117 and with the vertical scan selection signals s0/s1/s2_vd shifted at vertical scanning units 111 through 113.

In addition, the reset scanning unit 110 shifts the blacking line selection signal bk_1n in accordance with the vertical scan clock Vshf to specify the position of the black line.

On the other hand, the image information signal seg0/1/2 of k bits are supplied to the corresponding sample/hold unit 101 through 103 where they are sampled and held, and drive the pixels being written, which have been specified by the above operation, of the segmental display area 107 through 109. At the same time, when the black line is selected, the held values of the pixels are erased. Thus, the amounts of light fluxes irradiated on the segmental display areas 107 through 109 can be controlled by the held values.

Similarly, the image information signals 1_seg0/1/2 of s bits are supplied to the sample/hold units 114 through 116 where they are sampled and held, and drive the pixels being written of the segmental display areas 107 through 109 to turn on and off in corporation with the vertical scan selection signal 1_s0/1_s1/1_s2_vd, column scanning unit 117 and vertical scanning units 111 through 113. At the same time, when the black line is selected, the held values of the pixels are erased.

Thus, the reflected light fluxes are magnified by the projection lens 25, and projected on the screen 26 so that the image can be reproduced.

FIGS. 3 and 4 show an example of the above-mentioned operations of the display device 24 at particular pixels A, B and C shown in FIG. 2. In this embodiment, time T3 is equally assigned to the generation of each RGB color within the sub-frame period, and the black displaying times assigned to the colors at the time of color transition are represented by trk, tgk and tbk, respectively.

Figure 9:
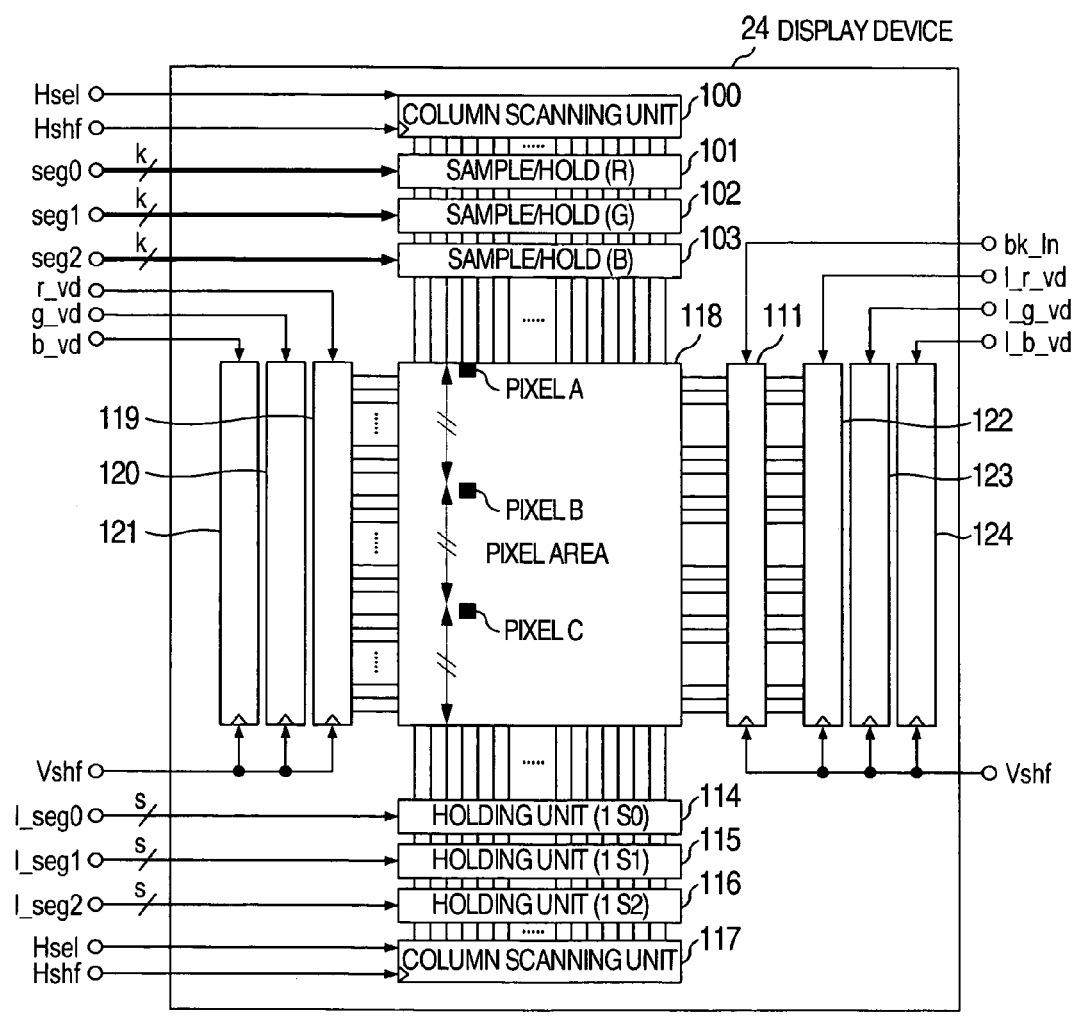
FIG. 9 is a diagram showing the construction of the display device used in the first embodiment according to the invention.
Figure 10:
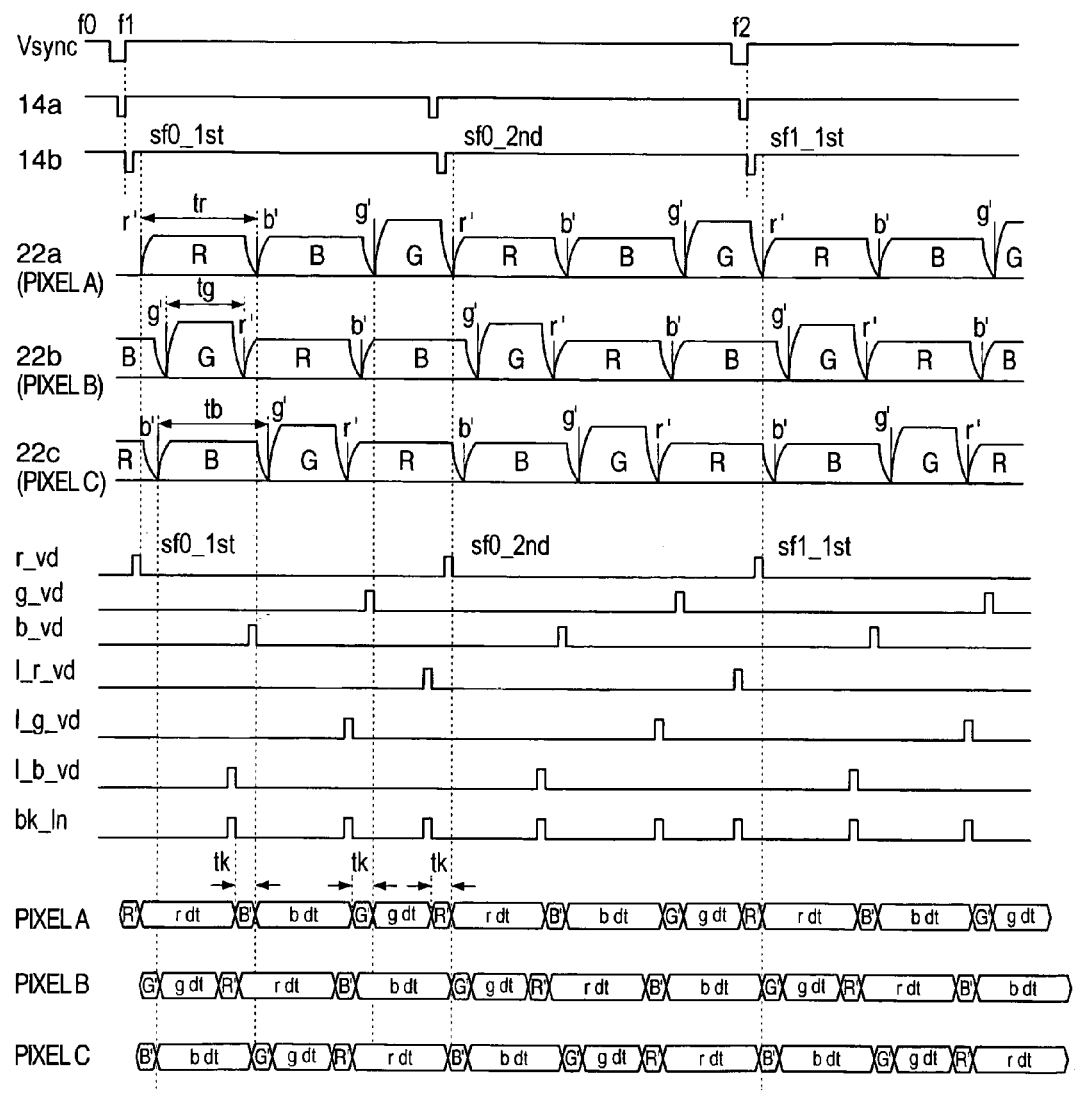
FIG. 10 is a waveform diagram to which reference is made in explaining the first and second embodiments of the invention.

FIGS. 5A and 5B show that the regions (periods) in which the image information signal of k bits is displayed are substantially equal in area with trk=tgk=tbk selected as type-1 blacking times. FIGS. 6A and 6B show that the regions (periods) in which the image information signal of k bits is displayed are made different in area with trk≠tgk≠tbk selected as type-2 blacking times. FIG. 9 shows the display device 24 constructed to have only a single segment with vertical operation units 119 through 124 arranged to be capable of simultaneously addressing a plurality of regions for respective R/G/B and R'/G'/B' light fluxes. FIG. 10 shows the operation timing at pixels A, B and C similar to FIG. 4. FIGS. 7A and 7B show that the regions (periods) in which the image information signal of k bits is displayed on the display device 24 of this construction are made different with trk=tgk=tbk selected as type 3. If the display device 24 of this construction is used, the regions (periods) in which the image information signal of k bits is displayed can be arbitrarily set with any type selected without limiting to type 3.

The image signal to be displayed is set in the above order in accordance with the light intensities 21*a*, 21*b* and 21*c* with which the light flux is irradiated at each pixel on the display device. During the transition period between the deflected light component fluxes, the display device 24 is blackened to avoid color mixture. Also, the equal spacing is realized by trk=tgk=tbk of type 1 or unequal spacing by trk≠tgk≠tbk of type 2. Thus, when the brightness of the flux irradiated on the display device 24 is constant, the amount of flux for the reproduction of image can be adjusted by controlling the black spacing. In addition, the line-shaped flux R'/G'/B' is irradiated on the above black region.

Thus, according to this embodiment based on the invention, the effective gradation number can be expanded by the relations of (1) the time length of on/off of pixels, (2) the increase or decrease of the amount of light flux converged to be a line shape, (3) the adjustment of light emission period and (4) the number of times that the light flux is deflected to scan the display device over the display region vertically or horizontally during each frame period. Thus, the image can be reproduced with high quality.

Moreover, since the amount of flux desired for the second light source is enough to express low gradation regions, and the flux is focused to be a line-shape by using the second converging unit, it is smaller than the first light source. Thus, since this image display apparatus can be reduced in cost and consumption power, and hence it is good for the environment.

If the display device 24 has 720 lines in the deflection direction, of which 240 lines are assigned to each primary component, and has w-line widths (line-shaped lines) and bk-line widths (black lines) to which the light flux is converged, the ratio between the amounts of light emission from the first and second light sources is substantially given by the relation of (first light source): (second light source)= (240-w-bk): w. In this case, if w=1, the amount of light emitted from the second light source is 1/(240-bk), and thus it is enough.

If the spectroscope/deflector 22 is constructed to prevent any light component from being leaked between the adjacent fluxes, the bk drive region can be removed without any problem.

In this embodiment mentioned above, the display device 24 may be constructed by using a very small mirror device, and the utilization factor of line-shaped R/G/B flux can be improved by using the flux response performance of the very small mirror device, and it is possible to make the reduction of the brightness necessary for the second light source.

In addition, the light emission characteristics (wavelength components) of the first light source 17 and second light source 18 may be made different in order for the gradation number of the reproduced image and the range of color reproduction to be expanded.

Also, while the spectroscope/deflector for color components is used to function as both spectroscope and deflector at the same time in this embodiment, the spectroscope and the deflector may be independently provided so that the separated light fluxes can be each deflected or that the deflected light flux can be separated into components. Other optical structures may be used to produce the same light fluxes as above.

The first and second converging units may be arranged on the light-exiting side of the first light source 17 so that part of the first light source can be used to send light to the second converging unit, which serves as the second light source 18. In addition, the second light source 18 may be replaced by a light source structure that reuses the light leaked from the first light source 17 or by an R/G/B LED used in combination. The methods for arranging the LED, and for converging the light may be arbitrary as long as the above converged light fluxes can be obtained.

Moreover, even if the range of color reproduction is expanded by increasing the number of primary colors used, the same effect can be naturally achieved by like processes.

The brightness of LED may be changed for each sub-frame. Thus, the gradation level per unit time can be changed so that more than the possible gradation number can be expressed in s bits.

Embodiment 2

Figure 8:
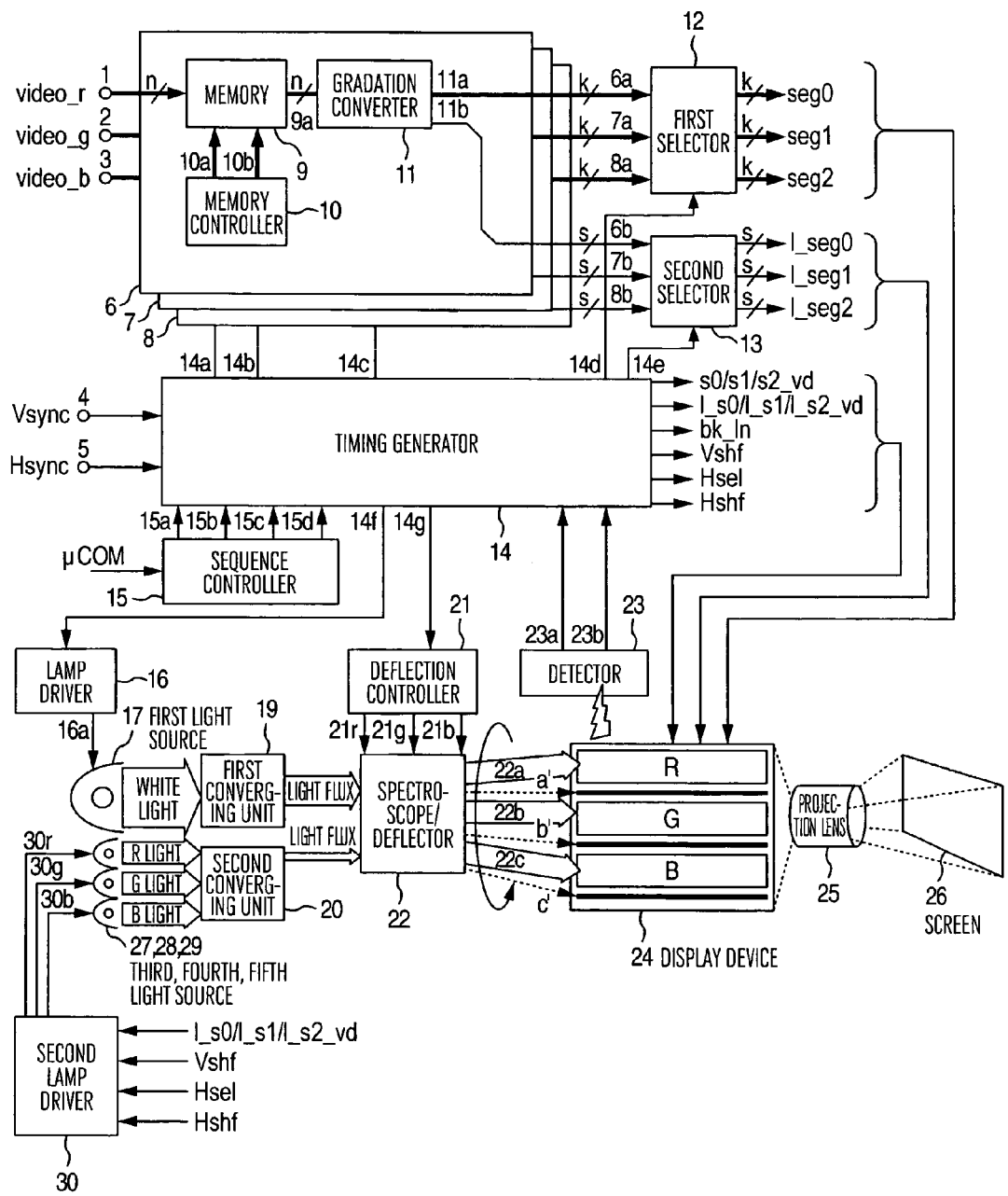
FIG. 8 is a block diagram showing the construction of an image display apparatus of the second embodiment according to the invention.

The image display portion of a projection type display apparatus of the second embodiment according to the invention will be described with reference to FIG. 8. In FIG. 8, like elements corresponding to those in the first embodiment and identified by the same reference numerals have substantially the same functions, and thus will not be described. Referring to FIG. 8, there are shown third, fourth and fifth light sources 27, 28 and 29 for emitting light of R/G/B, respectively, and a second lamp driver 30 for driving the third, fourth and fifth light sources 27, 28 and 29.

The second lamp driver 30 receives the image signal 1_seg0/1/2 of s bits for expanding gradation number from the second selector 13, and the scan selection signal 1_s0/ 1_s1/1_s2_vd, vertical scan clock Vshf, horizontal scan selection signal Hsel, and horizontal scan clock Hshf from the timing generator 14. The second lamp driver 30, when receiving the above signals, controls/drives the amount of light emission and light emission interval (flickering) of the third, fourth and fifth light sources 27, 28 and 29 in accordance with the position of the line along which the light is linearly irradiated on the display device 24 and with the position of the sub-frame. In this case, the brightness of the light or period of light mission from the third, fourth and fifth light sources 27, 28 and 29 may be individually controlled in accordance with the status of data of the pixels along which light is linearly irradiated. If a desired gradation can be obtained in a short time by pulsed light emission with the brightness increased, the dispersion with which the deflecting operation of the spectroscope/deflector 22 fluctuates, and the variation of the precision with which that structure is manufactured can be absorbed. In addition, if the image data to be reproduced is lines of only R, the light emission of G/B may be stopped.

Thus, according to the second embodiment, the third, fourth and fifth light sources for primary colors can be separately controlled with high precision, the effective gradation number can be easily expanded, and hence the image with high quality can be reproduced.

If the third, fourth and fifth light sources are driven to intermittently emit light, power consumption and amount of heat generation can be reduced, the good performance of parts can be maintained for a long time, and eco-friendly display apparatus can be produced While the input image signal of n bits is converted so that the gradation bit number can be increased to ((k+s)>n) bits by various signal computation processes in the above embodiments, the present invention is not limited to this approach. If the input image signal is converted so that the gradation bit number is equal to k or less than k as a result of various signal computation processes, the linear displaying of each color of s bits is not performed. That is, the displaying operation using line-shape fluxes other than strip-shape fluxes may be controlled to turn on or off on the basis of the gradation bit number of the input image signal.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A light valve type image display apparatus in which light corresponding to an image signal is projected from a display device onto a display screen to thereby display an image, said apparatus comprising:
 a converging unit constructed so that a light flux from a light source can be divided into main and sub light fluxes of different amounts each, and that said main and sub light fluxes can be converged;
 a spectroscope unit constructed so that each of said main and sub light fluxes converged by said converging unit can be separated into a plurality of color light fluxes; and
 a deflecting unit constructed so that said color light fluxes of each of said main and sub light fluxes can be irradiated onto different regions of said display device, and that the direction in which said fluxes are irradiated can be progressively shifted to a certain direction.

2. An image display apparatus according to claim 1, wherein said regions of said display device onto which said main color light fluxes are irradiated are driven by a plurality of more significant bits of the display gradation bits of said image signal, and said regions of said display device on which said sub color light fluxes are irradiated are driven by the remaining bits of the display gradation bits of said image signal.

3. An image display apparatus according to claim 2, wherein the frame period of said image signal is divided into a plurality of sub-frames, and one cycle of said irradiation of all said color light fluxes onto said display device is finished during each of said sub-frames.

4. An image display apparatus according to claim 3, wherein said light source is formed of a first light source for said main light flux, and a second light source for said sub light flux.

5. An image display apparatus according to claim 4, wherein the amounts of light emission from said first and second light sources are controlled for each of said sub-frames.

6. An image display apparatus according to claim 5, wherein the regions of said display device onto which the different color light fluxes of said main flux are irradiated are different in their area.

7. An image display apparatus according to claim 6, wherein said second light source is formed of an LED.

8. An image display apparatus according to claim 2, wherein said light source is formed of a first light source for said main light flux, and a second light source for said sub light flux.

9. An image display apparatus according to claim 8, wherein said second light source is formed of an LED.

10. A light valve type image display apparatus in which light corresponding to an image signal is projected from a display device onto a display screen to thereby display an image, said apparatus comprising:
 a light source for emitting a light flux having desired color components;
 a lamp-driving unit for driving said light source and controlling the amount of light emission from said light source;
 a converging unit constructed so that said light flux emitted from said light source can be divided into main and sub light fluxes and that said main and sub light fluxes can be converged to have different shapes;
 a spectroscope/deflector unit constructed so that the directions in which said two light fluxes converged by said converging unit are irradiated are each shifted, or said light fluxes are deflected, to a certain direction, and at the same time so that each of said two light fluxes can be separated into a plurality of primary color components, which are then irradiated onto different regions of said display device, respectively; and
 an image processing unit for generating image data, by which said display device is driven to display the corresponding image, on the basis of the situations in which said spectroscope/deflector unit deflects said fluxes on said display device,
 said image processing unit making a process to convert input image information of n bits to information of (k+s) bits ((k+s)>n, k>s), of which k more significant bits are assigned to said main light flux, and of which the remaining less significant bits of s bits to said sub light flux, so that said main and sub light fluxes of such bits can be supplied to said display device to drive it.

11. An image display apparatus according to claim 10, wherein said display device is constructed so that different pieces of image data are simultaneously supplied to said display device to drive it on different regions corresponding to the number of at least desired color components, and that said different regions corresponding to said number of at least desired color components are initialized at the same time.

12. An image display apparatus according to claim 11, wherein said spectroscope/deflector unit irradiates each of said light fluxes onto said display device, and deflect each flux in a line scanning direction.

13. An image display apparatus according to claim 12, wherein said sub light flux has a width equal to at least the width of a line of pixels.

14. An image display apparatus according to claim 13, wherein said display device is formed of liquid crystal elements, or pixels, and constructed to be driven so that all the pixels onto which said sub light flux is irradiated can be turned on and off.

15. An image display apparatus according to claim 13, wherein said display device is formed of ferroelectric liquid crystal elements, or pixels.

16. An image display apparatus according to claim 13, wherein said display device is formed of a mechanically movable reflecting plate.

17. An image display apparatus according to claim 13, wherein said certain direction is the vertical direction relative to the line scanning direction on said display device.

18. An image display apparatus according to claim 13, wherein said certain direction is the horizontal direction relative to the line scanning direction on said display device.

* * * * *